US009454382B2

(12) United States Patent
Adler et al.

(10) Patent No.: US 9,454,382 B2
(45) Date of Patent: Sep. 27, 2016

(54) VERIFICATION OF UML STATE MACHINES

(71) Applicant: International Business Machines Corporation, Armonk, NY (US)

(72) Inventors: Oshri Adler, Haifa (IL); Natalia Razinkov, Or-Aqiva (IL); Karen Yorav, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 240 days.

(21) Appl. No.: 14/052,777

(22) Filed: Oct. 14, 2013

(65) Prior Publication Data

US 2015/0106781 A1    Apr. 16, 2015

(51) Int. Cl.
*G06F 9/44* (2006.01)

(52) U.S. Cl.
CPC .............. *G06F 9/4436* (2013.01); *G06F 8/35* (2013.01)

(58) Field of Classification Search
CPC ............. G06F 8/20; G06F 8/35; G06F 9/444
USPC ......................................................... 717/104
See application file for complete search history.

(56) References Cited

U.S. PATENT DOCUMENTS 5,260,945 A * 11/1993 Rodeheffer ............ H01L 12/28 714/4.5
2007/0261040 A1* 11/2007 Ogilvie ..................... G06F 8/34 717/146
2008/0263524 A1   10/2008 Adams et al.
2011/0283254 A1* 11/2011 Merriman et al. ............ 717/105

OTHER PUBLICATIONS

Fecher et al., "UML 2.0 State Machines: Complete Formal Semantics Via Core State Machines", 2007, Springer Berlin Heidelberg, pp. 244-260.*
Eshuis et al., "Tool Support for Verifying UML Activity Diagrams", 2004, IEEE Transactions on Software Engineering, vol. 30, No. 7, pp. 437-447.*
Nguyen Trung Thanh, "A Novel Implementation for UML State Machine and Some Issues to Improve State Machine Semantics", Sep. 2004, The Research Institute of Posts and Telecom, pp. 1-7.*
Tom Maibaum, "Fundamental Approches to Software Engineering", Apr. 2000, Springer, Third International Conference, FASE 2000, pp. 130-131.*
Fecher et al., "UML 2.0 State Machines: Complete Formal Semantics via Core State Machines", Proceedings of the 11th international workshop, FMICS 2006 and 5th international workshop, PDMC conference on Formal methods: Applications and technology, pp. 244-260 , 2006.

(Continued)

*Primary Examiner* — Hang Pan
*Assistant Examiner* — Hui-Wen Lin
(74) *Attorney, Agent, or Firm* — Ziv Glazberg

(57) ABSTRACT

A method, apparatus and computer-implemented method, the method comprising: receiving a statechart comprising a complex feature; and replacing the complex feature with a transformed feature, thereby transforming the statechart to a second statechart, wherein replacing the complex feature comprises: creating an auxiliary variable or a default state; changing a value of the auxiliary variable at the beginning of the transformed feature and changing the value of the auxiliary variable again at its end; and taking a transition from the default state, such that the transition occurs in accordance with the value of the auxiliary variable.

17 Claims, 8 Drawing Sheets

(56) References Cited

OTHER PUBLICATIONS

Kevin Lano, "Slicing of UML State Machines", Proceedings of the 9th WSEAS International Conference on Applied Informatics and Communications (AIC '09), pp. 63-69, 2009.

Schattkowsky et al., "Transformation of UML State Machines for Direct Execution", Proceedings of the 2005 IEEE Symposium on Visual Languages and Human-Centric Computing (VL/HCC'05), pp. 117-124, 2005.

* cited by examiner

VERIFICATION OF UML STATE MACHINES

TECHNICAL FIELD

The present disclosure relates to formal verification in general, and to a method and apparatus for simplifying and transforming UML2 state machines, in particular.

BACKGROUND

State machines, also referred to as state charts, are tools for designing and organizing the way a device, computer program, or other (such as technical) process works, such that an entity or any of its components is in one of a number of possible states, or in an "and" combination of states, wherein well-defined conditional transitions exist between these states. State machines are useful in describing event-driven behaviors in which the system may take action or change its state in response to events such as user events, system events or others.

A UML state machine or statechart is an object-based variant of a state chart, which is adapted and extended by the Unified Modeling Language (UML) notation. UML state machines attempt to overcome the main limitations of traditional finite-state machines, while retaining their main benefits. UML statecharts introduce new concepts and features over traditional state charts, such as hierarchically nested states, orthogonal regions, extending the notion of actions, and other additions.

UML state machines have characteristics of both Mealy machines and Moore machines. Thus, UML state machines support actions that may depend on the state the system is at, as well as on the triggering event as in Mealy machines, and entry and exit actions associated with states rather than with transitions, as in Moore machines.

Although the specification of UML state machines is not formal, the executable sub-set thereof is well defined to allow tool vendors to support simulation and automatic code generation out of UML diagrams. This brings up the need for many purposes such as verification of UML state machines. In particular, formal verification is important for high integrity and safety critical domains. Formal verification relates to checking whether a condition holds for a system at all states, for example "the system is always in a stable state". The verification tool either approves that the condition holds at all times, or provides a counterexample.

However, UML statecharts are generally more complex and have more features than code programs. Therefore, code generation is a complex task, and therefore verification is mainly done by executing specific examples. Other known automatic UML verification tools take a UML statechart and translate, or synthesize it to the input language or format of an existing model checker or verification tool. However, such UML verification tools are limited in their ability to analyze UML statecharts and can handle only a simple sub-set of UML state machine features.

BRIEF SUMMARY

One aspect of the disclosure relates to a computer-implemented method performed by a computerized device, comprising: receiving a statechart comprising a complex feature; and replacing the complex feature with a transformed feature, thereby transforming the statechart to a second statechart, wherein replacing the complex feature comprises: creating an auxiliary variable or a default state; changing a value of the auxiliary variable at the beginning of the transformed feature and changing the value of the auxiliary variable again at its end; and taking a transition from the default state, such that the transition occurs in accordance with the value of the auxiliary variable.

Another aspect of the disclosure relates to an apparatus having a processing unit and a storage device, the apparatus comprising: an input receiving component for receiving a statechart comprising a complex feature; and a feature elimination component for replacing the complex feature with a transformed feature, thereby transforming the statechart to an enhanced statechart, wherein the feature elimination component comprises commands for: creating an auxiliary variable and a default state; changing a value of the auxiliary variable at the beginning of the transformed feature and changing the value of the auxiliary variable again at its end; and taking a transition from the default state, such that the transition occurs in accordance with the value of the auxiliary variable.

Yet another aspect of the disclosure relates to a computer program product comprising: a non-transitory computer readable medium; a first program instruction for receiving a statechart comprising a complex feature; and a second program instruction for replacing the complex feature with a transformed feature, thereby transforming the statechart to a second statechart, wherein the second program instruction replacing the complex feature comprises: a third program instruction for creating an auxiliary variable or a default state; a fourth program instruction for changing a value of the auxiliary variable at the beginning of the transformed feature and changing the value of the auxiliary variable again at its end; and a fifth program instruction for taking a transition from the default state, such that the transition occurs in accordance with the value of the auxiliary variable, and wherein said first, second, third, fourth and fifth program instructions are stored on said non-transitory computer readable medium.

BRIEF DESCRIPTION OF THE SEVERAL VIEWS OF THE DRAWINGS

The present disclosed subject matter will be understood and appreciated more fully from the following detailed description taken in conjunction with the drawings in which corresponding or like numerals or characters indicate corresponding or like components. Unless indicated otherwise, the drawings provide exemplary embodiments or aspects of the disclosure and do not limit the scope of the disclosure. In the drawings.

DETAILED DESCRIPTION

Figure 1:
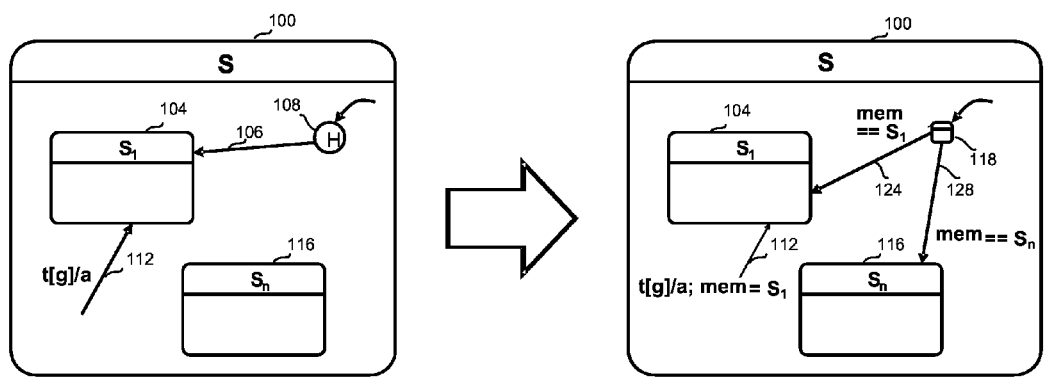
FIG. 1 shows an illustrative example of a method for eliminating shallow history from UML diagrams, in accordance with some exemplary embodiments of the disclosed subject matter.

The disclosed subject matter is described below with reference to flowchart illustrations and/or block diagrams of methods, apparatus (systems) and computer program products according to embodiments of the subject matter. It will be understood that blocks of the flowchart illustrations and/or block diagrams, and combinations of blocks in the flowchart illustrations and/or block diagrams, can be implemented by computer program instructions. These computer program instructions may be provided to one or more processors of a general purpose computer, special purpose computer, a tested processor, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a non-transient computer-readable medium that can direct a computer or other programmable data processing apparatus to function in a particular manner, such that the instructions stored in the non-transient computer-readable medium produce an article of manufacture including instruction means which implement the function/act specified in the flowchart and/or block diagram block or blocks.

The computer program instructions may also be loaded onto a device. A computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

One technical problem dealt with by the disclosed subject matter relates to the current inability to transform UML diagrams containing complex features and constructs such as nesting, entry actions, exit actions and others into simpler diagrams that do not contain such features.

Another technical problem dealt with by the disclosed subject matter relates to the resulting inability to activate processes such as formal verification of UML diagrams. While UML diagrams may be used for designing complex systems such as software, hardware or mechanical systems, the inability to verify such systems significantly limits their usability. Current techniques convert UML diagrams into the input language or format of code generation tools, such that formal verification techniques may be applied to the resulting code. However, such conversion is feasible only for simple UML diagrams or statecharts, and not to diagrams containing complex features and constructs.

One technical solution comprises the elimination of complex constructs and features from UML diagrams while preserving the underlying behavior and functionality. Thus, the resulting diagram is equivalent in behavior to the original one but does not comprise complex features. Automatic tools, such as code generation tools, verification tools, hardware design generation tools or others may then be applied to the converted diagrams.

Yet another technical solution relates to a sequence of actions which may be taken for eliminating complex constructs from UML diagrams. In some exemplary embodiment, the sequence of actions may include:

1. Creating (if not created earlier) an auxiliary variable and a new default state;

2. Changing the auxiliary variable at the beginning of the transformed feature and changing the auxiliary variable again at its end, and optionally adding or amending an internal transition in order to start a process; and 3. Taking a transition from the new default state, such that the transition occurs in accordance with the value of the auxiliary variable. In some embodiments, if the auxiliary value indicates that no eliminated transition is in process, a transition takes place from the new state points to the default state, thus maintaining the same behavior. If the auxiliary value indicates that a replacement transition is in process, the behavior changes.

Yet another technical solution relates to activating a sequence of actions for eliminating one complex feature from a UML diagram, thus receiving a simpler diagram. The process may then be repeated for other complex features, until no more complex features are present in the resulting diagram, which may then be provided as input to a code generation tool.

One technical effect of utilizing the disclosed subject matter is the transformation of a UML diagram containing complex features to a simpler diagram which does not contain such features.

Another technical effect of utilizing the disclosed subject matter is the possibility to use a converter for converting the simplified UML diagram into code, such that verification tools may be used to verify the original complex UML diagram.

A state chart comprises one or more states, each of which may be compound or simple, i.e., it may or may not, respectively, contain substates. Each compound state may comprise at least one region, such that each region comprises at least one of the substates. All regions of a state are active simultaneously when the state is active, wherein the regions may represent parallel computing threads. A statechart may further comprise one or more transitions, each of which may have a source state and destination state. A transition may be associated with a trigger, such that only if the triggering event occurs the transition is enabled. A transition may also be associated with a guard which is a Boolean expression evaluated at runtime. If the guard evaluates to TRUE, the transition may be taken, otherwise it may not be taken. Each transition may also be associated with an action, which is executed upon firing of the transition. In the executable subset of UML an action comprises a snippet of executable code. An action may comprise a series of operations separated by a separator such as a semicolon. If a transition has no trigger it may occur once its source state becomes active, provided its guard, if any, holds true. A transition may be annotated as follows: trigger_event [guard]/action, wherein any of the parts may be omitted.

A compound state may have a default substate which is entered once the compound state is entered. It will be appreciated that any of the substates may be entered directly as a target of a transition, in which case the default state will not be assumed.

FIGS. 1 to 6 show examples of complex features and how these features may be eliminated from state charts, using the steps described above. It will be appreciated that the method and apparatus are not limited to these features, and that other features may also be eliminated using these steps.

Referring now to FIG. 1, showing an illustration of a method for eliminating shallow history from a UML diagram.

The UML diagram of FIG. 1 comprises a compound state S (100) which contains states $S_1$ (104) and $S_n$ (116), indicating that in a general case the state S may contain any number of states. S (100) comprises history-state H (108) which represents a memory state, such that if S (100) is exited when in a particular lower level state for example $S_1$ (104) and then re-entered, the same lower level state is assumed.

In order to eliminate the history feature, a new state $S_h$ (118) may be added, and the default state of S (100) becomes $S_h$ (118).

In addition, a fresh attribute or variable, named for example "mem", may be added, having type enumeration of the names of all substates in S (100), and initialized to the default state, i.e., the state that is the target of the transition exiting the history state in the original diagram, being $S_1$ (104). The term "fresh" relates to a variable, a state, a region, a transition or any other entity that is added by the transformation, and does not constitute a part of the model. However, in some cases the term "fresh" is omitted for brevity and clarity sake.

Then for each state s in S (100):

1. A transition such as transitions 124 and 128 is added from the default state $S_h$ (118) to s, the transition guarded by the condition [mem==s], such that the transition only occurs if the value of mem is equal to s; and 2. For each transition entering s, such as transition 112, "mem=s" is appended at the end of the action associated with the transition, thus ensuring this state will be resumed.

History-state H (108) and the transition exiting it may then be removed.

The resulting UML diagram does not contain a history pseudo-state, but yet preserves the same behavior of resuming the last low-level state when re-entering the top level state.

Figure 2:
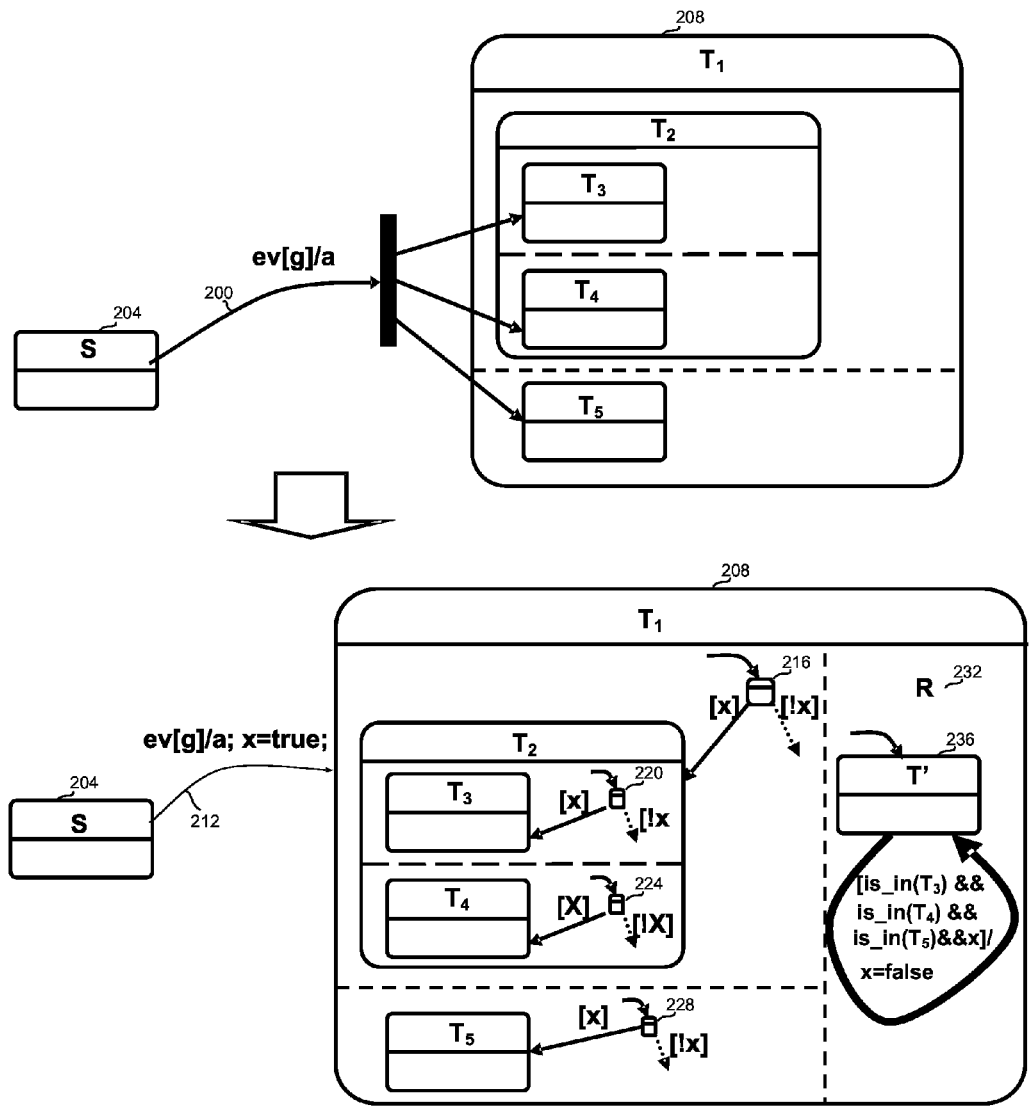
FIG. 2 shows an illustrative example of a method for eliminating fork pseudo states from UML diagrams, in accordance with some exemplary embodiments of the disclosed subject matter.

Referring now to FIG. 2, showing an exemplary illustration of eliminating fork transitions from UML diagrams.

A fork transition represents a transition Tr (200) from source state S (204) to a target set of states $\{T_1, \ldots, T_n\}$, such that $T_1$ through Tn reside in pair-wise orthogonal regions. In the example of FIG. 2 the target state set is $\{T_3, T_4, T_5\}$.

A least common ancestor state T is defined as a state containing all the target states, such that there are no states contained in T which contain all target states. In the example of FIG. 2, the least common ancestor is state $t_1$ (208).

The elimination detailed below assumes that there are no history nodes in the regions containing the target states and contained in the least common ancestor of the target states. If there are history nodes, they may be eliminated by applying the method shown in FIG. 1 above.

Transition Tr (200) may be replaced with a transition $Tr_1$ (212) from S (204) to $T_1$ (208). The trigger event and the guard of Tr (200) remain the same for $Tr_1$ (212). In addition, the assignment "x=true" is appended to the action, wherein x is a fresh Boolean variable associated with this transition.

For every trigger-less transition within T, at any level the predicate "&& (!x)" is added to the guard of the transition, thus ensuring that the guard is not evaluated to TRUE unless x is negative, i.e., a fork transition is not in process. This additional guard ensures that other transitions will not interfere when the fork is in process and descending the hierarchy.

For every region r under t and containing at least one $T_i$ which is at least one of the target states $T_1 \ldots T_n$ the following steps may be performed:

1. A new initial state such as states 216, 220, 224 and 228 is added, with a transition guarded by "!x" pointing to the original initial state, such that it does not interfere with transitions not related to the fork, and a transition guarded [x] pointing to $T_i$. With the added states, when the common ancestor is entered after x has been set to TRUE, execution traverses all states at all levels associated with the fork transaction, such that the same effect as the fork transition is achieved and all target states are assumed. This transformation replaces a fork transition from a source state to a number of states which occurs in some arbitrary order (since orthogonal regions represent separate threads), with sequential activation of the states according to the state hierarchy between the state machine.

2. A new fresh region R 232 having a fresh single state T' (236) is added, which is also the initial state of the common ancestor, and a single self-transition, labeled with the guard: "IS_IN($T_1$) && . . . && IS_IN($T_n$) && x", and with the action "x=false;". Thus, if the common ancestor such as state $T_1$ (208) is reached when all target states have been reached, the Boolean variable x associated with the transition is set to false since the transition has been completed. Otherwise, either the transition is in action, or it has not started, in which cases it is not required to assign FALSE to the variable.

This transformation may be optimized as follows: if any of the involved regions already had a dummy initial state added due to one of the other transformations, the new state is not required, and it is enough to add the new transition labeled [x] top the target state, and add the "&& (!x)" clause to the other transitions.

Figure 3:
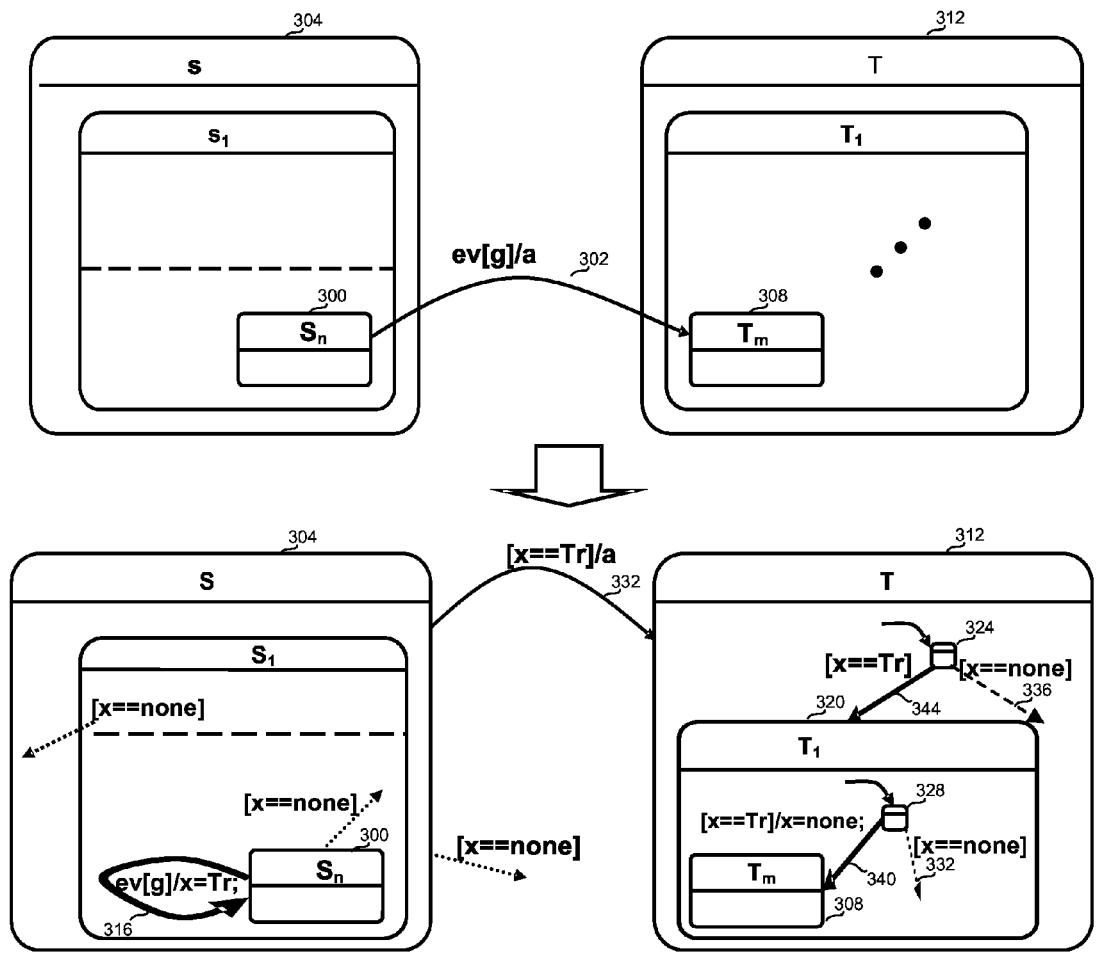
FIG. 3 shows an illustrative example of a method for eliminating multi-level transitions from UML diagrams, in accordance with some exemplary embodiments of the disclosed subject matter.

Referring now to FIG. 3, showing an illustration of a method for eliminating transitions between states that are not in the same region from UML diagrams, also referred to as multi-level transition. In FIG. 3 and subsequent figures, an internal transition is marked by its trigger, guard and action being indicated within the area bound by the arrow representing the transition and the state. For a self-loop, however, the trigger, guard and action are indicated externally to this area.

A multi-level transition 302 may exit state $S_n$ (300) embedded directly or indirectly within a state S (304), and enter a state $T_m$ 308 embedded directly or indirectly within a state T (312).

This transformation may not operate for states having a history node. Thus, such nodes first have to be eliminated in accordance with the method disclosed on FIG. 1 above. This transformation may also not work for transitions that cross orthogonal regions of the same state. However, such transitions are not properly defined and in some environments it is generally attempted to avoid them.

As can be seen in FIG. 3, in a graphical manner a multi-level transition crosses the boundary lines of states which are ancestors of the source or target states of the transition. When such a multi-level transition fires it causes the execution of all exit actions of the source state and its ancestors, and the entry actions of the target state and its ancestors. Using the algorithm detailed below provides for transitions that do not cross state boundaries, while still performing the relevant exit actions of the source state and its ancestors and the entry actions of the target state and its ancestors. This is done by setting a variable to indicate that the specific transition is in process, and as long as the variable indicates the specific transition, imitating the built-in hierarchical execution of the exit and enter actions by explicitly traversing the states in a hierarchical manner. When the original target is reached, the variable is set to none.

In a formal manner, in order to eliminate a multi-level transition, the following steps may be taken:

1. An enumerated private attribute x may be added to the state chart, having possible labels of all the multi-level transitions in the state-chart, plus an additional label "none". x may be initialized to "none". Alternatively, a Boolean variable may be associated with each multi-level transition, such that x will be replaced with one or more Boolean variables.

2. For each trigger-less transition in the state-chart, its guard is appended with the condition "&& (x==none)" (or if no guard existed, a guard requiring (x==none) is created). Thus, these transitions will remain unchanged when executed not during a multi-level transition, but will not proceed and not interfere during the transformed transition.

3. For each multi-level transitions Tr, optionally having trigger ev, guard g and an action:

3.1 Determine the lowest common region (LCR) of the source of Tr and the target of Tr.

3.2 Compute the set of states Tenter that are entered when Tr fires, and are direct ancestors of the target of Tr but not the target itself. It will be appreciated that due to orthogonal regions there can be states that are entered due to Tr firing, but are not ancestors of the target of Tr. These states are not inserted into Tenter. In the example of FIG. 3, Tenter comprises T (312), $T_2$ (320) and $T_m$ (308).

3.3 Let S (304) be the ancestor of the source of Tr in the LCR.

3.4 Let T (312) be the ancestor of the target of Tr in the LCR.

3.5 Add a transition 332 from S (304) to T (312) labeled "[x==Tr]/a" wherein a is the action of Tr. If T is also a target of Tr then append "x=none;" to action a.

3.6 Add to the source of Tr an internal transition 316 labeled ev[g]/x=Tr; wherein ev and g are the trigger and guard of Tr.

3.7 For each compound state c in Tenter:

3.7.1 If c does not contain a state added in a previous run of this loop then:

3.7.1.1. Add a new fresh state new_s, such as states 324 and 328, which is the default of c.

3.7.1.2. Add a transition from new_s to the original default state in c with guard [x==none], such as transitions 332 and 336.

3.7.2. Add a transition from new_s to the state in c that is an ancestor of the target of Tr (this is unique) with guard [x==Tr], such as transitions 340 and 344.

3.7.3. If the target of this new transition is the target of Tr, then 3.8.3.1. Make "x=none;" be the action of the new transition.

3.8 Remove transition Tr.

It will be appreciated that the method may be optimized as follows: if the default state in a compound state c is a state that was added in previous transformation, such as when eliminating history nodes, then the existing state may be used instead of adding a new one. This may be done by conjuncting (x==none) to all outgoing transitions (now there may be more than one), and adding the transition with guard (x==T) as detailed above.

Figure 4:
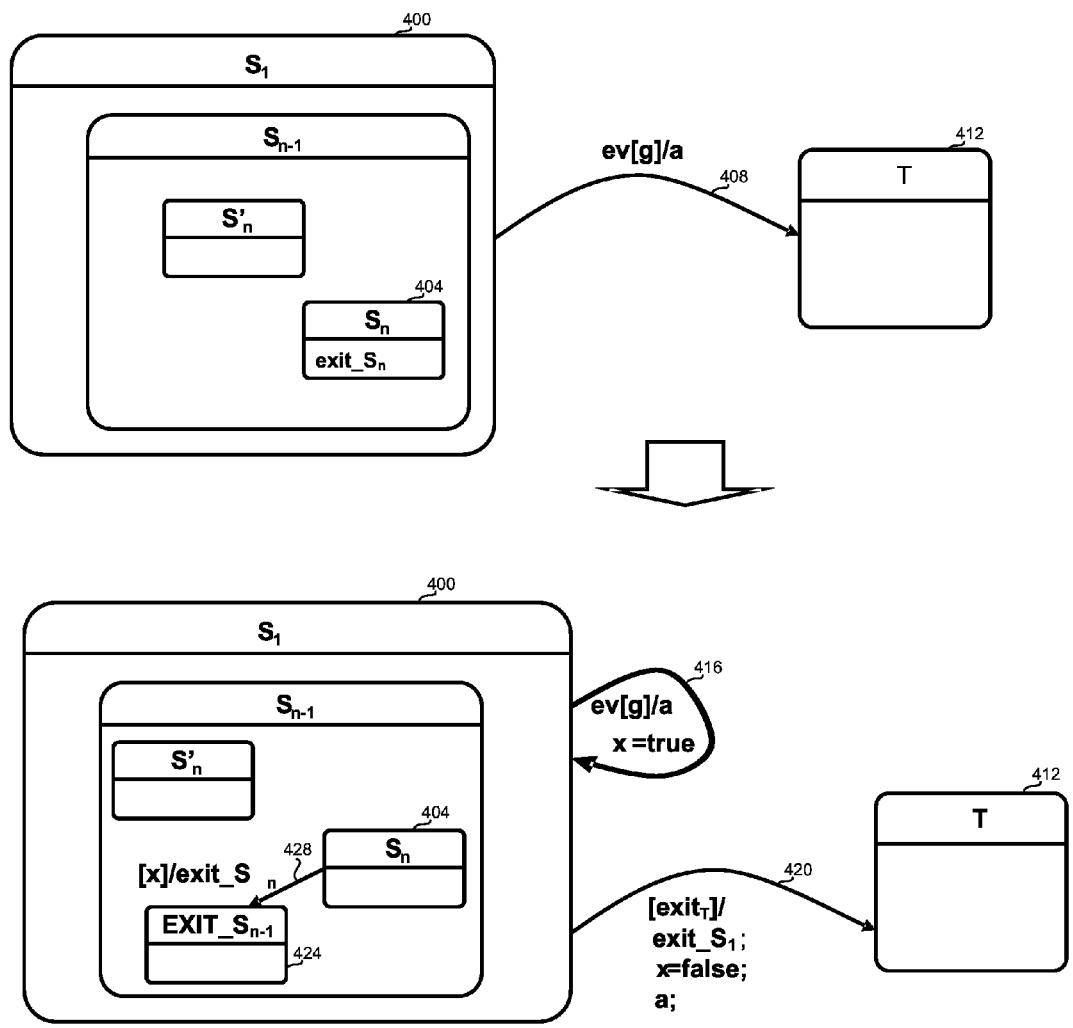
FIG. 4 shows an illustrative example of a method for eliminating exit actions from UML diagrams, in accordance with some exemplary embodiments of the disclosed subject matter.

Referring now to FIG. 4 showing an illustration of a method for eliminating exit actions from UML diagrams.

This transformation may not operate for states having a history node. Thus, such states have to be handled in accordance with the method disclosed on FIG. 1 above. This transformation may also not work for multi-level transitions, therefore such states have to be handled in accordance with the method disclosed on FIG. 3 above. If the transition contains entry actions, they may be eliminated as disclosed in FIG. 5 below.

An exit action is an action taking place when a state is exited. If a compound state is exited, all active internal states are exited as well, and their exit actions, if such exist, are performed in addition and prior to the exit action of the compound state.

For example in FIG. 4, when state $S_1$ (400) is exited to state T (412) on transition 408 having event ev and guard g, its exit action is performed, as well as the exit action exit_$S_n$ of internal state $S_n$ (404). The exit actions are performed such that the exit actions of a compound state is performed after the exit actions of states contained therein have been completed.

In order to eliminate exit actions, an internal transition 416 is added to the source of the original transition, guarded by the original guard and trigger. The internal transition sets an "exit" variable, associated with the transition, to TRUE. A new state 424 and a new transition 428 between state 404 having an exit action and the new state 424 indicating an exit state are added. New transition 428 is guarded by the new variable and has an action which is the exit action of original state 404. Thus, if the new variable is true, as set by self transition 416 of the top level state upon the event and guard of the top level exit transition, then transition 428 can be fired, and exit_Sn action may be performed.

In a formal manner, such transformation may be described as follows:

1. Loop on all states s in the state chart. For example in accordance with Depth First Search (DFS) order, from the leaves to the root:

1.1 If state S is flagged (s cannot be a leaf):

1.1.1 For each outgoing (but not internal) transition T from S:

1.1.1.1 Add a boolean private attribute $exit_T$ initialized to FALSE 1.1.1.2 Flag T with $exit_T$ as a parameter (e.g., as a field of a stereotype)

1.1.1.3 Add an internal transition on S with T's guard and trigger, and with the action being: "$exit_T$=true;" (guard will later be modified)

1.1.1.4 Remove T's trigger;

1.1.1.5 Replace T's guard with [$exit_T$] (guard will later get additions)

1.1.1.6 Prepend to T's action "exit_$S_1$; $exit_T$=false;" (if exit_$S_1$, being the exit action of the top level state, if it does not exist only "$exit_T$=false" is prepended).

1.2 If S has an exit action then:

1.2.1 If there is no exit-indicating state (such as state 424) in the region, add a fresh exit state.

1.2.2. Add a transition from S to the new exit state;

1.2.3 Set the new transition's action to be the exit action of s.

1.2.4 Set the new transition's guard to "false" (guard will be updated later);

1.2.5. Add the new transition to LIST1
1.2.6. If S is not flagged
    1.2.6.1 For each outgoing transition T from S that is not internal, prepend the exit action of S to the action of T.
1.2.7 Remove the exit action from S;
1.2.8 flag S
1.3 if S is flagged then flag parent of S
2. Loop on all flagged transitions T (order doesn't matter; $exit_T$ is the variable added for T)
  2.1 For all transitions T' outgoing the source of T, including internal transitions:
    2.1.1. If T' !=T append "&& (!$exit_T$)" to the guard of T'.
  2.2 For all transitions T' below the source of T (at all levels and of all types) and all those orthogonal to source(T)
    2.2.1. If T' is in LIST1
      append to the guard of T': "‖$exit_T$"
    else
      append to the guard of T': "&& (!$exit_T$)"

It will be appreciated that a number of optimizations may be provided for this transformation. First, if a transition has a trigger, then it is not required to append "&& (!$exit_T$)" to its trigger. Second. There is no need to append "&& (!$exit_T$)" to flagged transitions. Third, there is no need to create a new state for the top region.

Figure 5:
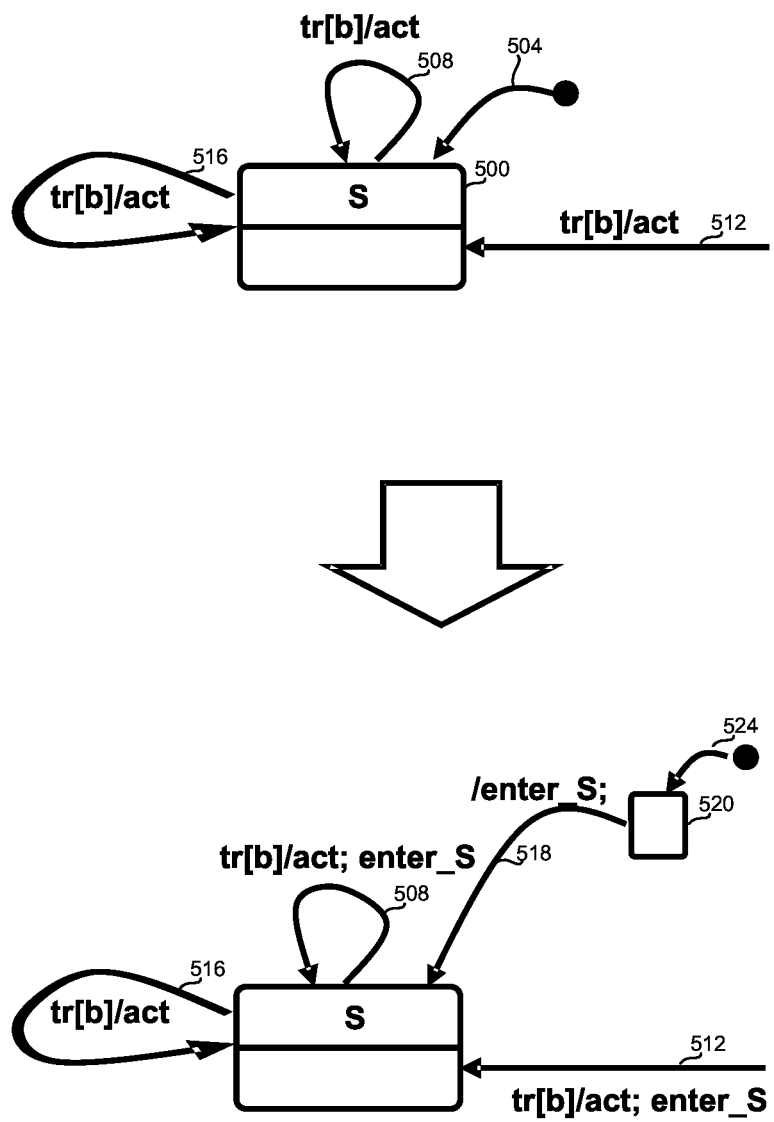
FIG. 5 shows an illustrative example of a method for eliminating entry actions in a single level state from UML diagrams, in accordance with some exemplary embodiments of the disclosed subject matter.

Referring now to FIG. 5, showing an illustration of a method for eliminating entry actions from UML diagrams.

FIG. 5 shows a statechart with a state S (500), having an entry action enter_S, an ordinary self transition 508, an internal transition 516 (which is a self transition that does not invoke entry and exit actions and does not cause the default state to become active), transition 512 which is an ordinary transition from an arbitrary state, and transition 504 from a default state.

This transformation assumes that the state chart does not contain history nodes and does not contain multi-level transitions. If such features are contained, they may be eliminated as described in association with FIG. 1 and FIG. 3 above.

An entry action may be eliminated by adding the action to all the transitions incoming to the state, excluding internal transitions. In order to add the entry action also to a default transition (a default transition cannot be associated with an action), the default transition is replaced by a default state having a transition to the state, the transition associated with the entry action.

Formally, eliminating an entry action may be performed as follows:
1. For all states that have an entry action, such as state S (500):
  1.1 For all default states (such as state S (500)): add an extra fresh state 520, and add a transition 518 from the new state to the default state;
It will be appreciated that this step may also be performed for transitions entering S that originate from SendAction-States, since these too may not have actions on them.
  1.2 For all transitions incoming into a state (including the newly added ones), such as transitions 516, 508, 512 and 518:
    1.1.1 If the transition is not internal (such as transitions 516, 508 and 512), then append the entry action of the state as the last action on the transition.

Figure 6:
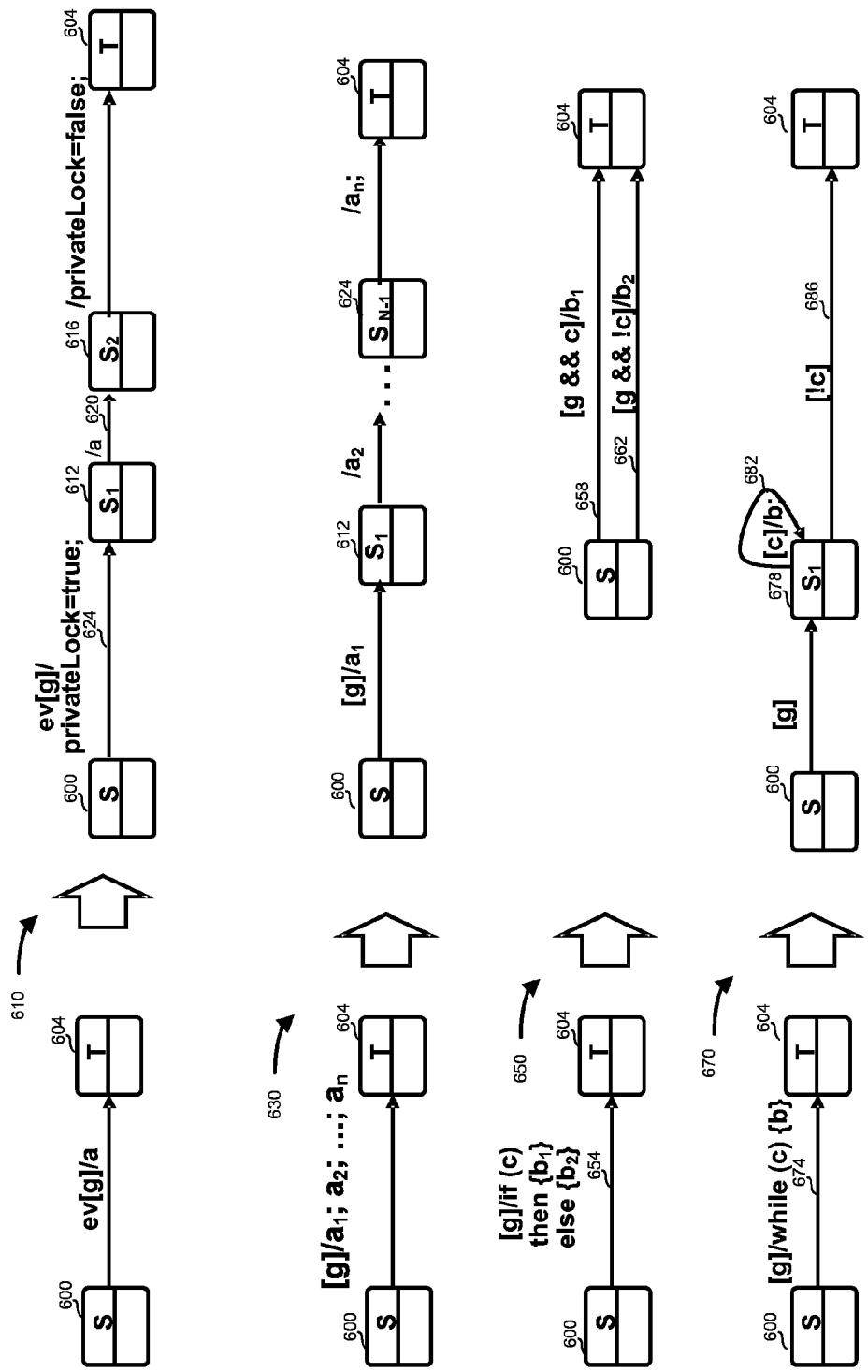
FIG. 6 shows an illustrative example of a method for breaking down actions in UML diagrams into simple commands, in accordance with some exemplary embodiments of the disclosed subject matter.

Referring now to FIG. 6 showing an illustration of a method for breaking down actions in UML diagrams into simple commands.

This transformation may not operate for states having multilevel transitions. Thus, states containing multilevel transitions have to be handled in accordance with the method disclosed on FIG. 3 above.

A simple command in UML is an assignment, an event generation, or an operation call. General actions are built on top of simple commands by way of sequential composition, conditionals, and loops. Other constructs, such as switch statements, for loops, or the like can be supported in a similar manner.

In order to eliminate multi-action transitions, on a first step 610 the trigger is separated from the action. FIG. 6 shows statechart comprising a source state S 600, a target state T 604, and a transition 608 therebetween, which has a trigger and optionally a guard, and which is associated with action a which may be complex, i.e., comprises a multiplicity of simple commands or a construct. On step 610, two new fresh states $S_1$ (612) and $S_2$ (616) are added, as well as a transition 620 therebetween, which is associated with action a. A transition is added between state S 600 and state $S_1$ 612, having the same event and guard as the original transition, and having an action of setting a variable, named for example PrivateLock to TRUE. The transition between $S_2$ (616) and T (604) is added which sets the variable to FALSE. Once this step is completed, all transitions associated with non-simple commands have no trigger.

On a second step 630, a transition having no trigger and actions $a_1 \ldots a_n$, is transformed as follows: fresh states are added, labeled for example $S_1$ (612) $\ldots S_{n-1}$ (624). A transition is formed between stats S (600) and newly created state $S_1$ (612) which has the same guard as the original transition, and action $a_1$. A transition is also formed between any two subsequent new states, $S_i$ and $S_j$, having action $a_j$. Yet another transition is added between $S_{n-1}$ (624) and T (604) which has action $a_n$.

As shown in step 650, any of the actions $a_1 \ldots a_n$, such as action 654 may be an "if" statement with a C condition and actions $b_1$ and $b_2$, such that if C holds than $b_1$ takes place, and otherwise $b_2$ takes place. In such case, two transitions 658 and 662 may be created between the two associated states. The trigger of transition 658 is appended with "C" and is associated with action $b_1$, and the trigger of transition 662 is appended with "Not C" and the associated action is $b_2$. Thus, if C holds, action $b_1$ takes place, while if C does not hold, action $b_2$ takes place, without an explicit IF construct.

As shown in step 670, any of the actions $a_1 \ldots a_n$ such as action 674 may be a "while" statement with a C condition and action b which is to be repeated as long as C holds. In such case, a new fresh state $S_1$ (678) is added, with a self transition 682 having C as guard, and action b. State $s_1$ (678) also has a transition to the target of the original transition with guard "Not C". Thus, b is performed as long as C holds, without an explicit WHILE command.

This transformation may be formally described as follows:
1. For each state machine a Boolean variable privateLock is added and initialized to false. The expression "!privateLock" may be added to the guards of all original transitions in the state machine.
2. Loop over all transitions Tr from S to T having a trigger ev, a guard g and a non-simple action a. For each transition:
  2.1 Add two fresh states s1 and s2.
  2.2 Replace the transition with the following transitions:
    2.2.1 A transition from S to S1, having the same trigger and guard as Tr, and an action of setting variable privateLock to True.

2.2.2. A transition from S1 to S2 having a as an action.

2.2.3 A transition from S2 to T having an action of setting privateLock to FALSE.

3. Loop over all transitions form S to T having a non-simple action A and having no trigger.

3.1 If A is non-simple and comprises actions $a_1 \ldots a_n$ then:

3.1.1 Add mew fresh states $S_1, \ldots, S_{n-1}$ 3.1.2 Replace the transition with the following transitions:

From S to S1 having the same guard as Tr and action $a_1$

From $S_{i-1}$ to $S_i$ for $2<=i<=n-1$ having action

From $S_{n-1}$ to T having action $a_n$.

3.2. If a is an IF statement having condition C and actions $b_1$ or $b_2$ depending on whether C holds or not, respectively, then replace the transition with:

A transition from S to T having the same guard appended with C and action $b_1$, and A transition from S to T having the same guard appended with "not C" and action $b_2$.

3.3 If a is a WHILE statement having condition C and action b, then:

3.3.1. Add a new fresh state $S_1$.

3.3.2 Replace the transition with:

A transition from S to $S_1$ having the same guard.

A self transition of $S_1$ having guard C and action b.

A transition from $S_1$ to T having guard "Not C".

Figure 7:
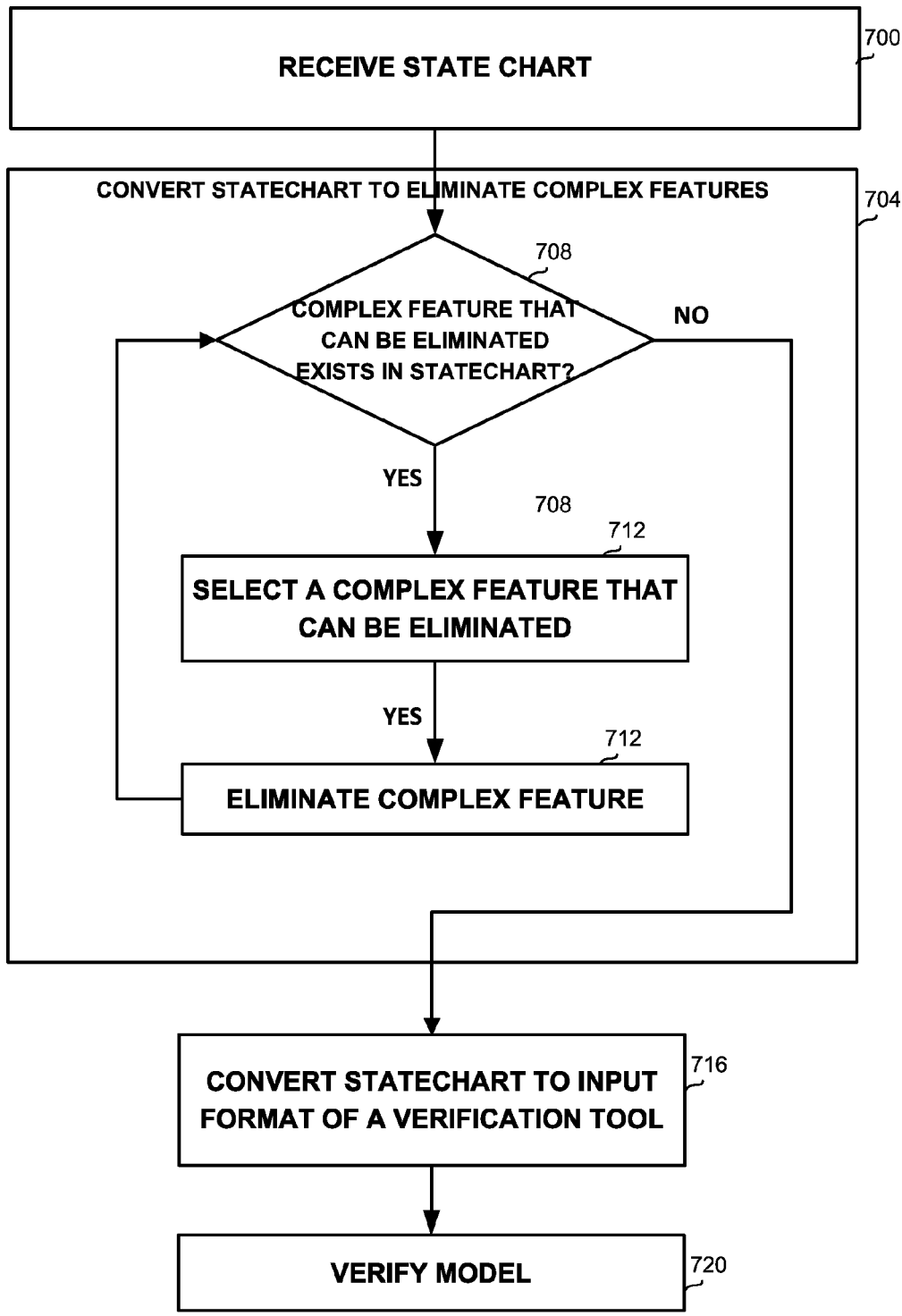
FIG. 7 shows a flowchart diagram of steps in a method for generating and using code from a statechart, in accordance with some exemplary embodiments of the disclosed subject matter.

Referring now to FIG. 7, showing a flowchart of steps in a method for generating and using code from a statechart.

On step 700 a statechart may be received. The statechart may be received from any source such as a storage device or user interface of a program for designing statecharts, using any communication channel such as the Internet, Intranet, Local area Network, Wide Area Network, or the like, and in any protocol.

On step 704 the statechart may be converted to eliminate complex features and thus provide a simpler statechart.

Step 704 of converting the statechart may comprise a check on step 708 whether a complex feature that can be eliminated exists in the statechart. The complex features may include but are not limited to shallow history nodes, fork transitions, multilevel transitions, exit actions, multiple-actions transitions and entry actions. However, in order to eliminate some complex features, other features have to be eliminated first. For example, in order to eliminate a multi-level transition, history nodes have to be eliminated first. Thus, the check on step 708 relates to complex features that can be eliminated at the time of the check. If a feature cannot be eliminated since there are other features that need to be eliminated first, once these features are eliminated the first feature may be checked again. Checking whether there are features that may be eliminated may be performed in any order, for example in an arbitrary order over the statechart, by checking all sub-features of a given feature, or the like.

On step 708 a feature that can be eliminated may be selected, and on step 712 the feature may be eliminated Elimination may depend on the specific feature being handled. Any of the feature types mentioned above may be eliminated using the corresponding method exemplified and detailed in association with one of FIGS. 1-6 above.

Some of the eliminations may use the following scheme:

1. Creating (if not created earlier) an auxiliary variable and a new default state; 2. Changing the auxiliary variable at the beginning of the transformed feature and changing the auxiliary variable back at its end, and optionally adding or amending an internal transition in order to start a process; and 3. Taking a transition from a newly created default state, such that the transition occurs in accordance with the value of the auxiliary variable.

When no more complex features exist, on step 716 the statechart without the complex features may be converted to the input language or input format of a verification tool, thus creating a model that may be verified.

On 720 the model may be used for any purpose, such as model verification or the like.

Figure 8:
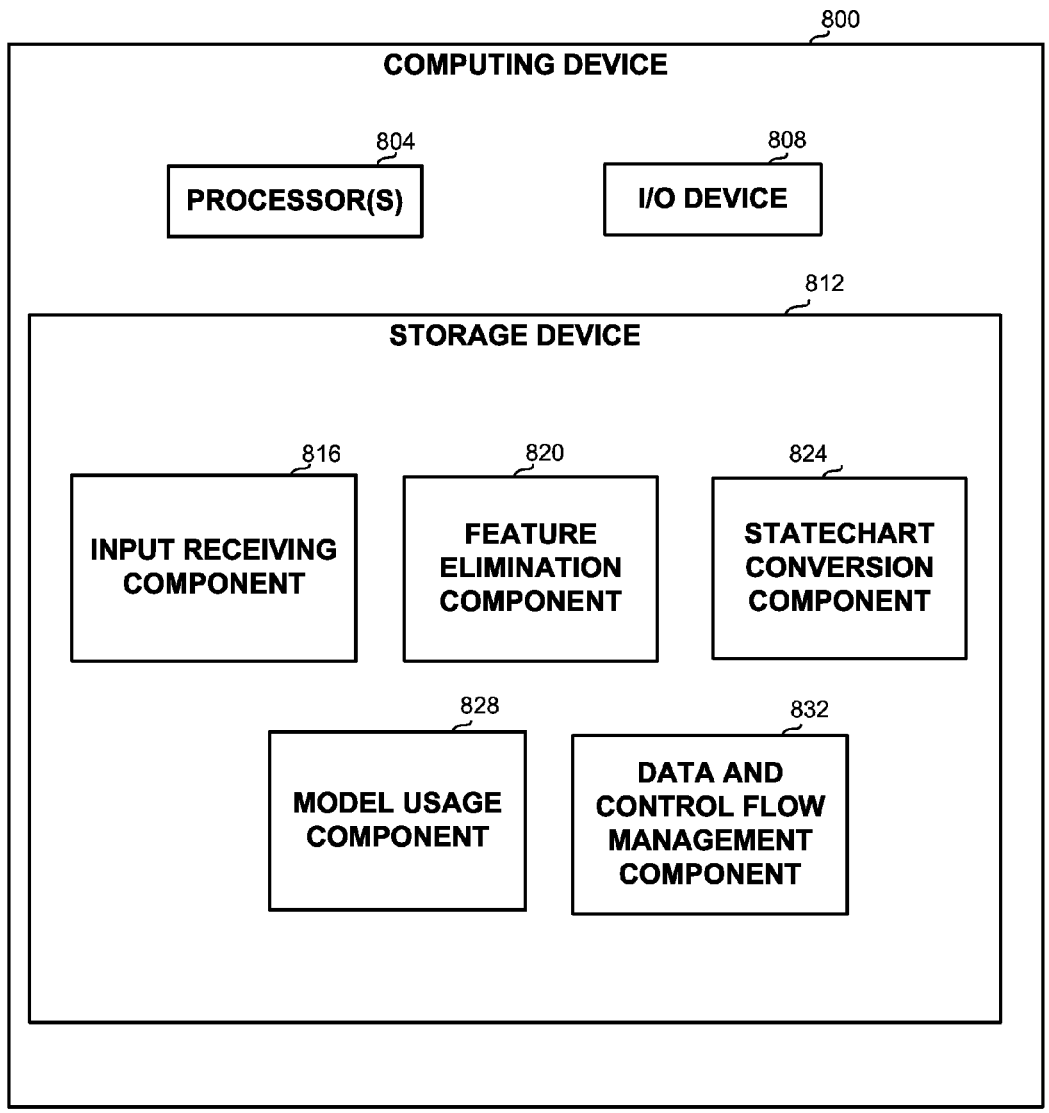
FIG. 8 shows a block diagram of components of an apparatus for generating and using code from a statechart, in accordance with some exemplary embodiments of the disclosed subject matter.

Referring now to FIG. 8, showing a block diagram of an apparatus for generating and using code from a statechart.

The apparatus may comprise a computing platform 800. Computing platform 800 may comprise a processor 804. Processor 804 may be a Central Processing Unit (CPU), a microprocessor, an electronic circuit, an Integrated Circuit (IC) or the like. Alternatively, computing platform 800 can be implemented as firmware writen for or ported to a specific processor such as digital signal processor (DSP) or microcontrollers, or can be implemented as hardware or configurable hardware such as field programmable gate array (FPGA) or application specific integrated circuit (ASIC). Processor 804 may be utilized to perform computations required by computing platform 800 or any of it subcomponents.

In some embodiments, computing platform 800 may comprise an input-output (I/O) device 808 such as a terminal, a display, a keyboard, an input device or the like, used to interact with the system, to invoke the system and to receive results. It will however be appreciated that the system can operate without human operation.

In some exemplary embodiments, computing platform 800 may comprise one or more storage devices such as storage device 812. Storage device 812 may be persistent or volatile. For example, storage device 812 can be a Flash disk, a Random Access Memory (RAM), a memory chip, an optical storage device such as a CD, a DVD, or a laser disk; a magnetic storage device such as a tape, a hard disk, storage area network (SAN), a network attached storage (NAS), or others; a semiconductor storage device such as Flash device, memory stick, or the like. In some exemplary embodiments, storage device 312 may retain program code operative to cause processor 304 to perform acts associated with any of the steps shown in FIG. 107 above for example eliminating complex features from statecharts, or the like.

The components detailed below may be implemented as one or more sets of interrelated computer instructions, executed for example by processor 804 or by another processor. The components may be arranged as one or more executable files, dynamic libraries, static libraries, methods, functions, services, or the like, programmed in any programming language and under any computing environment.

Storage device 812 may comprise input receiving component 816 for receiving the required input, such as the statechart to be converted and used. The statechart may be received from a storage device, from a user interface device, from a system for developing statecharts, or from any other source.

Storage device 812 may comprise feature elimination component 820 for eliminating a particular feature from a statechart, such as a shallow history node, an exit action, or the like. The features may be eliminated using a corresponding method such as the methods exemplified in FIGS. 1-6 above. Feature elimination component 820 may comprise a feature recognition component for recognizing a feature to be eliminated. Alternatively, a separate feature recognition component may be used which receives a statechart, identifies features to be eliminated and activates the corresponding elimination component for each such feature.

Storage device 812 may also comprise statechart conversion component 824 for converting a statechart to a format appropriate for another tool, such as a model verification tool.

Storage device 812 may also comprise model usage component 828 for using the resulting model, for example verifying it, or the like.

Yet another component of storage device 812 may be data and control flow management component 832 for managing the flow of information and control between other components, for example receiving and storing the statechart received by input receiving component 816, passing it to feature elimination component 820, passing the resulting statechart to statechart conversion component 824, and passing the resulting model to model usage component 828.

It will be appreciated that multiple enhancements and modifications may exist to the method and apparatus.

The flowchart and block diagrams in the figures illustrate the architecture, functionality, and operation of possible implementations of systems, methods and computer program products according to various embodiments of the present disclosure. In this regard, each block in the flowchart and some of the blocks in the block diagrams may represent a module, segment, or portion of program code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As will be appreciated by one skilled in the art, the disclosed subject matter may be embodied as a system, method or computer program product. Accordingly, the disclosed subject matter may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product embodied in any tangible medium of expression having computer-usable program code embodied in the medium.

Any combination of one or more computer usable or computer readable medium(s) may be utilized. The computer-usable or computer-readable medium may be, for example but not limited to, any non-transitory computer-readable medium, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, and the like.

Computer program code for carrying out operations of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

What is claimed is:

1. A computer-implemented method performed by a computerized device, comprising:
   receiving a statechart comprising at least two complex features; and for each complex feature of the at least two complex features replacing the complex feature with a transformed feature, thereby transforming the statechart to a second statechart while preserving behavior of the statechart,
wherein replacing the complex feature comprises:
creating an auxiliary variable which was not comprised by the statechart and a default state;
changing a value of the auxiliary variable at the beginning of the transformed feature and changing the value of the auxiliary variable again at its end;
taking a transition from the default state, such that the transition occurs in accordance with the value of the auxiliary variable
converting the second statechart to input format of a verification tool to obtain a model to be verified; and
verifying the model,
wherein the computerized device comprises a processing unit and a storage device.

2. The computer-implemented method of claim 1, wherein the complex feature is a shallow history.

3. The computer-implemented method of claim 1, wherein the complex feature is a fork transition.

4. The computer-implemented method of claim 1, wherein the complex feature is a multilevel transition.

5. The computer-implemented method of claim 1, wherein the complex feature is an exit action of a state.

6. The computer-implemented method of claim 1, wherein the complex feature is an entry action of a state.

7. The computer-implemented method of claim 1, wherein the complex feature is a multi-action transition.

8. The computer-implemented method of claim 1, wherein the complex feature is an IF action.

9. The computer-implemented method of claim 1, wherein the complex feature is a WHILE action.

10. An apparatus comprising:
a processing unit;
a storage device;
an input receiving component for receiving a statechart comprising at least two complex feature; and
a feature elimination component for replacing each complex feature of the at least two complex features with a transformed feature, thereby transforming the statechart to an enhanced statechart while preserving behavior of the statechart,
wherein the feature elimination component comprises commands for:
creating an auxiliary variable which was not comprised by the statechart and a default state;
changing a value of the auxiliary variable at the beginning of the transformed feature and changing the value of the auxiliary variable again at its end;
taking a transition from the default state, such that the transition occurs in accordance with the value of the auxiliary variable
a statechart conversion component for converting the enhanced statechart to input format of a verification toot to obtain a model; and
a model verification component for verifying the model.

11. The apparatus of claim 10, wherein the complex feature is a shallow history.

12. The apparatus of claim 10, wherein the complex feature is a fork transition.

13. The apparatus of claim 10, wherein the complex feature is a multilevel transition.

14. The apparatus of claim 10, wherein the complex feature is an exit action of a state.

15. The apparatus of claim 10, wherein the complex feature is an entry action of a state.

16. The apparatus of claim 10, wherein the complex feature is a multi-action transition.

17. A computer program product comprising:
a non-transitory computer readable medium;
a first program instruction for receiving a statechart comprising at least two complex feature; and
a second program instruction for replacing each complex feature of the at least two complex features with a transformed feature, thereby transforming the statechart to a second statechart while preserving behavior of the statechart,
wherein the second program instruction replacing the complex feature comprises:
a third program instruction for creating an auxiliary variable which was not comprised by the statechart and a default state;
a fourth program instruction for changing a value of the auxiliary variable at the beginning of the transformed feature and changing the value of the auxiliary variable again at its end; and
a fifth program instruction for taking a transition from the default state, such that the transition occurs in accordance with the value of the auxiliary variable,
a sixth program instruction for converting the second statechart to input format of a verification tool to obtain a model to be verified; and
a seventh program instruction for verifying the model,
wherein said first, second, third, fourth, fifth, sixth and seventh program instructions are stored on said non-transitory computer readable medium.

* * * * *